(12) United States Patent
Berktold

(10) Patent No.: US 12,311,453 B2
(45) Date of Patent: May 27, 2025

(54) INTERNAL HELICAL BROACHING TOOL

(71) Applicant: Forst Technologie GmbH & Co. KG, Solingen (DE)

(72) Inventor: Andreas Berktold, Neuss (DE)

(73) Assignee: Forst Technologie GmbH & Co. KG, Solingen (DE)

( * ) Notice: Subject to any disclaimer, the term of this patent is extended or adjusted under 35 U.S.C. 154(b) by 657 days.

(21) Appl. No.: 17/420,342

(22) PCT Filed: Dec. 20, 2019

(86) PCT No.: PCT/EP2019/086683
§ 371 (c)(1),
(2) Date: Jul. 1, 2021

(87) PCT Pub. No.: WO2020/141110
PCT Pub. Date: Jul. 9, 2020

(65) Prior Publication Data
US 2022/0080518 A1    Mar. 17, 2022

(30) Foreign Application Priority Data
Jan. 3, 2019  (DE) ...................... 10 2019 200 022.3

(51) Int. Cl.
*B23D 43/06* (2006.01)
*B23D 43/00* (2006.01)

(52) U.S. Cl.
CPC ................................ *B23D 43/005* (2013.01)

(58) Field of Classification Search
CPC ...... B23D 43/005; B23D 43/02; B23D 43/06; B23D 37/16; B23D 37/14
See application file for complete search history.

(56) References Cited

U.S. PATENT DOCUMENTS

| 3,276,100 A | 10/1966 | Psenka |
| 3,439,398 A * | 4/1969 | Jacobson ............. B23D 43/005 407/18 |
| 3,795,958 A | 3/1974 | Psenka |
| 3,815,193 A | 6/1974 | Moore |
| 5,503,506 A * | 4/1996 | Yuan ...................... B23D 43/02 29/90.01 |
| 2004/0109731 A1 | 6/2004 | Weghaus et al. |
| 2004/0223825 A1 | 11/2004 | Kakutani et al. |
| 2004/0228698 A1 | 11/2004 | Kakutani et al. |

(Continued)

FOREIGN PATENT DOCUMENTS

| CN | 201889532 | 7/2011 |
| CN | 103537751 B | 1/2016 |

(Continued)

OTHER PUBLICATIONS

Material Data Sheet for Tungsten Carbide (Year: NA).*

(Continued)

*Primary Examiner* — Alan Snyder
(74) *Attorney, Agent, or Firm* — Smartpat PLC

(57) ABSTRACT

An internal helical broaching tool has a pre-broaching tool portion ex-tending in one broaching direction and a subsequent precise sizing tool portion. The latter, as a whole, is made of a hard metal with a density of greater than 10 g/cm3. This results in an internal helical broaching tool with increased service life at a defined machining performance.

10 Claims, 2 Drawing Sheets

(56) References Cited

U.S. PATENT DOCUMENTS

| | | | | |
|---|---|---|---|---|
| 2011/0020078 A1* | 1/2011 | Katsuki | ............. | B23F 21/26 407/13 |
| 2011/0195375 A1* | 8/2011 | Kuehner | ............. | B23F 21/26 433/102 |
| 2015/0336192 A1* | 11/2015 | Katsuki | ............. | B23D 43/005 407/15 |
| 2016/0001384 A1* | 1/2016 | Katsuki | ............. | B23D 43/04 407/18 |

FOREIGN PATENT DOCUMENTS

| | | |
|---|---|---|
| CN | 108672806 A | 10/2018 |
| DE | 2338821 A1 | 2/1974 |
| DE | 3621422 A1 | 1/1988 |
| DE | 102009016939 A1 | 10/2009 |
| DE | 102011109106 A1 | 2/2013 |
| EP | 0447996 | 9/1991 |
| EP | 1426131 B1 | 6/2004 |
| EP | 1477255 A1 | 11/2004 |
| GB | 1269772 A | 4/1972 |
| JP | S5286088 U | 6/1977 |
| JP | H10309622 A | 11/1998 |
| JP | 2001239425 A | 9/2001 |
| JP | 2002137118 A | 5/2002 |
| JP | 2002283141 A | 10/2002 |
| JP | 2004345056 A | 12/2004 |
| JP | 2005040871 A | 2/2005 |
| WO | 2018083743 A1 | 5/2018 |

OTHER PUBLICATIONS

English translation of EP1426131A1 (Year: 2004).*
Martins, Vinicius & Rodrigues, Wilson & Ferrandini, Peterson & Villarinho, Denis & Körnschild, Gerhard & Schaeffer, Lirio. (2010). Comparative Studies of WC—Co and WC—Co—Ni Composites Obtained by Conventional Powder Metallurgy. Materials Research. 14. 274-279. 10.1590/S1516-14392011005000037.
China National Intellectual Property Administration, Office Action in related application CN201980087478.3.
European Patent Office, Office Action in related patent application EP 19 832 947.6.
Japanese Patent Office, 2nd Office Action in related Japanese Patent Appln. No. 2021-538663.
Japanese Patent Office, First Office Action in related Japanese Patent Appln.No. 2021-538663.
Vogtel, Patrik, Fritz Klocke, and Dieter Lung. "High performance machining of profiled slots in nickel-based-superalloys." Procedia CIRP 14 (2014): 54-59.

* cited by examiner

INTERNAL HELICAL BROACHING TOOL

CROSS-REFERENCE TO RELATED APPLICATION

This application claims the priority of German Patent Application, Serial No. 10 2019 200 022.3, filed Jan. 3, 2019, pursuant to 35 U.S.C. 119(a)-(d), the content of which is incorporated herein by reference in its entirety as if fully set forth herein.

TECHNICAL FIELD

The invention relates to an internal helical broaching tool.

BACKGROUND

Internal helical broaching tools are known from DE 23 38 821 C2, EP 1 426 131 A1 and U.S. Pat. No. 3,276,100. A broaching tool is known from U.S. Pat. No. 3,815,193. A broaching tool made of hard metal is known from EP 1 477 255 A1. A method for producing grooved internal profiles on hardened workpieces and broaches suitable therefor are known from DE 36 21 422 A1. JP S52 86088 U describes a broaching tool with cutting edges made of a hard metal. Hard metals are known from the technical article "Comparative studies of WC-Co and WC-Co-Ni composites obtained by conventional powder metallurgy" by M. Vinicius et al, materials research, Vol. 14, No. 2, 3 Jun. 2011, pages 274-279. JP 2001 239425 A discloses an internal broaching tool with multi-row fine machining broaching teeth made of a composite carbon alloy. JP 2002 137118 A discloses an internal broaching tool for generating straight grooves, the broaching tool portion of which may be made of a composite foil material alloy. JP 2004 345056 A discloses a broaching tool as well as a method for broaching tooth profiling.

SUMMARY

It is an object of the present invention to further develop an internal helical broaching tool of the type mentioned above in such a way that its service life is increased at a defined machining performance.

This object is achieved according to the invention by an internal helical broaching tool with a pre-broaching tool portion extending in a broaching direction, and a subsequent precise sizing tool portion, wherein broaching teeth of the pre-broaching tool portion are arranged one behind the other in the broaching direction such that the broaching teeth are arranged obliquely one behind the other along helical broaching paths, wherein broaching teeth of the precise sizing tool portion are arranged one behind the other, wherein the precise sizing tool portion is manufactured in total of a hard metal whose density is greater than 10 g/cm$^3$.

The precise sizing tool portion of the internal helical broaching tool is used for smoothing, i.e. for removing small amounts of material from a workpiece to be machined for the fine machining of same. Cutting speeds during tool machining with the internal helical broaching tool are in particular in the range between 1 m/min to 12 m/min, for example in the range between 5 m/min to 10 m/min. Surprisingly, it has been found that a precise sizing tool portion of an internal helical broaching tool does not necessarily need to be made of high-speed steel, which was previously set in particular due to the ductile properties of such high-speed steels. Despite the tool loads which occur during helical broaching, in particular an impact load and a torsional load, it has surprisingly turned out that hard metal is suitable as a material for the precise sizing tool portion. Machining of the precise sizing tool portion with the required accuracy to produce high-precision internal helical toothings can be carried out, in particular with software support, by means of diamond grinding wheels that are aligned in a controlled manner. A grinding result during dressing of the diamond grinding wheels for machining the hard metal precise sizing tool portion can be monitored, in particular optically, to detect an actual profile value of the grinding wheel. The diamond grinding wheels can be dressed with high precision using diamond dressing tools. To this end, a flank accuracy of the diamond grinding wheels can be maintained up to a tolerance of 1 μm. Using these machining methods, a precise sizing tool portion made of hard metal can be manufactured with manufacturing tolerances which correspond to those achieved in the state of the art for precise sizing tool portions made of high-speed steel.

Although certain hard metals are already mentioned in the prior art in connection with internal broaching, for example in US 2004/0223825 A1 and JP 2005-040 871 A, the hard metal is not used here for helical broaching in each case.

The pre-broaching tool portion of the internal helical broaching tool can be manufactured of high-speed steel.

The hard metal may have a density which may be greater than 10.5 g/cm$^3$, which may be greater than 11 g/cm$^3$, which may be greater than 11.5 g/cm$^3$, which may be greater than 12 g/cm$^3$, which may be greater than 12.5 g/cm$^3$, which may be greater than 13 g/cm$^3$, which may be greater than 13.5 g/cm$^3$, which may be greater than 14 g/cm$^3$, which may be greater than 14.5 g/cm$^3$, or even greater. In particular, the density of the hard metal may be in the range between 12.0 and 15.0 g/cm$^3$.

As hard metal, a tungsten carbide-cobalt hard metal, a tungsten carbide-titanium carbide-cobalt hard metal, a tungsten carbide-tantalum-niobium carbide-cobalt hard metal, a tungsten carbide-zirconium carbide-cobalt hard metal or also a cermet can be used. Instead of tungsten carbide, titanium carbide, titanium nitride, niobium carbide, tantalum carbide or vanadium carbide can also be used for the hard metal. As a binding matrix as an alternative or in addition to cobalt, nickel and/or iron can also be used. The tungsten carbide grains of the hard metal can have an average grain size in the range between 0.1 μm and 25 μm and in particular in the range between 0.15 μm and 10 μm or in the range between 1 μm and 3 μm.

The precise sizing tool portion and/or the pre-broaching tool portion can have a helical toothing with a plurality of threads.

Broaching teeth of at least one of the group comprising the pre-broaching tool portion and the precise sizing tool portion, in particular of the precise sizing tool portion, with a positive rake angle, surprisingly have also proven to be possible when using hard metal as material. Hard metal broaching teeth with positive rake angle also withstand the loads of internal broaching of helical toothings. Some or all of the broaching teeth of the pre-broaching tool portion and/or the precise sizing tool portion can have a positive rake angle.

The advantages of a hard metal precise sizing tool portion are particularly well realised in an embodiment wherein the precise sizing tool portion is configured in the form of a precise sizing bush which is slid onto a tool carrier portion. Here, too, it has been found that hard metal is suitable for configuring a precise sizing bush without causing breakage when the tool is used.

Both a base body of the tool and a socket or bush, if present, can be provided with a coating. Such a coating can in particular serve for a reduction of wear. The coating can therefore be an anti-wear coating. If the socket or bush is manufactured of hard metal, it can be provided with a different coating than the base body.

An embodiment of the invention is explained in more detail below with reference to the drawing.

DETAILED DESCRIPTION

Figure 1:
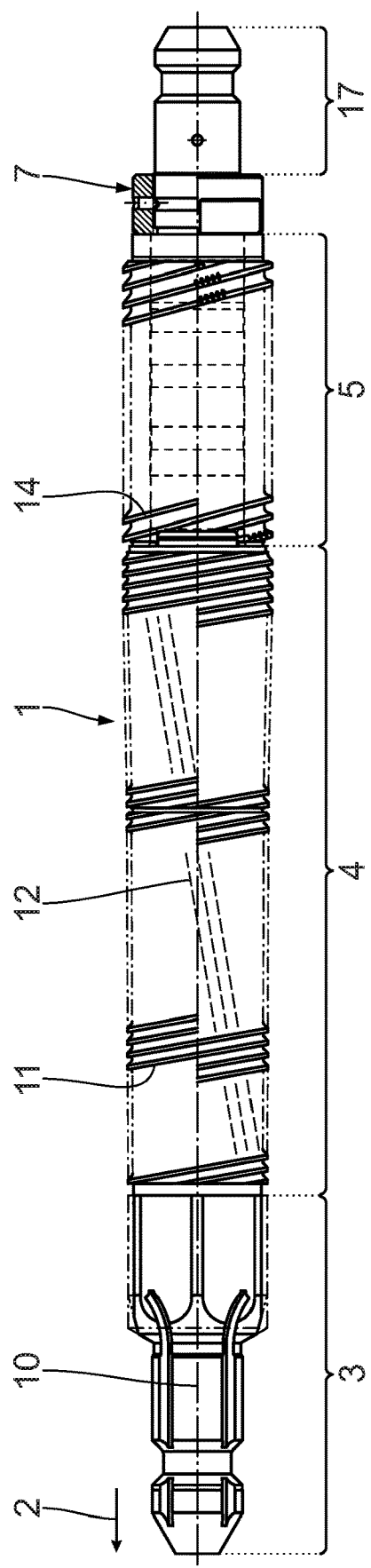
FIG. 1 in a side view as well as in the region of a precise sizing bush partially broken to illustrate internal details and in the region of a fastening nut or a clamping ring for the precise sizing bush partially in portion, shows an internal round profile broaching tool in the form of an internal helical broaching tool.

An internal helical broaching tool 1 is used for broaching internal round profiles of gears with helical toothing. For this purpose, the tool 1 is displaced in a broaching direction 2 relative to a workpiece not shown in the drawing, in which the helical toothing is generated.

In FIG. 1 on the left, the tool 1 has a tool head portion 3, on which a drive for displacing the tool 1 in the broaching direction 2 can engage. This is followed by a pre-broaching tool portion 4 extending in the broaching direction 2 and a precise sizing tool portion 5 in the form of a precise sizing bush following in the broaching direction 2. The functions of the pre-broaching tool portion 4 and the precise sizing tool portion 5 basically correspond to those of internal helical broaching tools known from the prior art. In this context, reference is made to DE 23 38 821 B2, EP 1 426 131 A1 and U.S. Pat. No. 3,276,100.

The precise sizing bush 5 is slid onto a carrier portion 6 of a base body of the tool 1 in FIG. 1 from the right. The carrier portion 6 is firmly connected to the pre-broaching tool portion 4 and can seamlessly merge into the tool head portion 3.

A fastening nut 7, which in FIG. 1 is screwed onto the carrier portion 6 from the right, serves to fix the precise sizing bush 5 to the carrier portion 6 and clamps the precise sizing bush 5 between an abutment wall 8 of the fastening nut 7 and a counter-abutment shoulder 9 of the basic body of the tool 1. At the same time, the counter-abutment shoulder 9 represents a transition portion between the carrier portion 6 and the pre-broaching tool portion 4.

Instead of a fastening nut, a clamping ring without thread can also be used to fix the precise sizing bush 5 to the carrier portion 6.

Broaching teeth of the pre-broaching tool portion 4, which are not shown in more detail, are arranged one behind the other in the broaching direction 2 along helical circumferential rows of teeth 11 around a longitudinal axis 10 of the tool 1 in such a way that broaching teeth of successive helical paths of the rows of teeth 11 are each arranged obliquely one behind the other along broaching paths 12. In FIG. 1, three such broaching paths 12 are indicated by dashed lines. An oblique course of the broaching paths 12 corresponds to an oblique course of the helical toothing to be generated in the workpiece.

Figure 2:
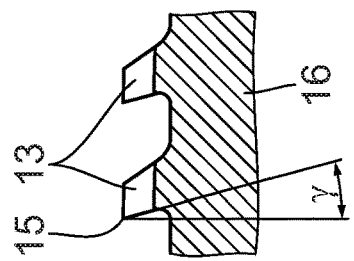
FIG. 2 in a view similar to FIG. 1, shows the precise sizing bush of the tool according to FIG. 1.

In FIGS. 1 and 2, a number of broaching teeth 13 of the precise sizing bush 5, which also run along helical circumferential rows of teeth 14 around the longitudinal axis 10, are highlighted. For illustration purposes, only some of the rows of teeth 14 extending in the broaching direction and some terminating in the broaching direction are shown in FIGS. 1 and 2.

The pre-broaching tool portion 4 on the one hand and the precise sizing bush 5 on the other hand thus each have a helical toothing with a plurality of threads each. A gear distance is smaller for the pre-broaching tool portion 4 than for the precise sizing tool portion 5. In an alternative embodiment not shown, the gear distance for the pre-broaching tool portion 4 can also be as large as for the precise sizing tool portion 5 and can also be larger than for the precise sizing tool portion 5.

Figure 3:
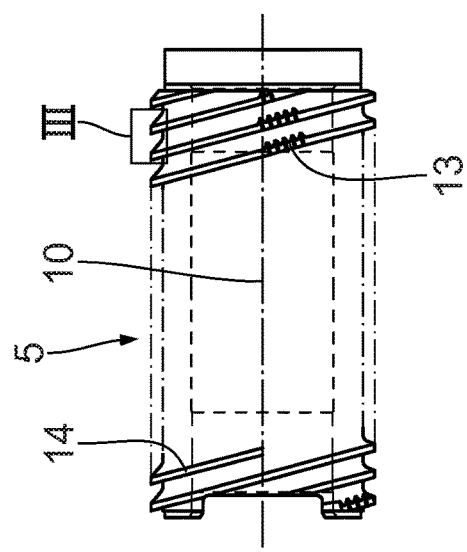
FIG. 3 shows an axial longitudinal portion of a detail III of the precise sizing bush according to FIG. 2 in the region of two broaching teeth arranged one behind the other in a broaching direction.
Figure 4:
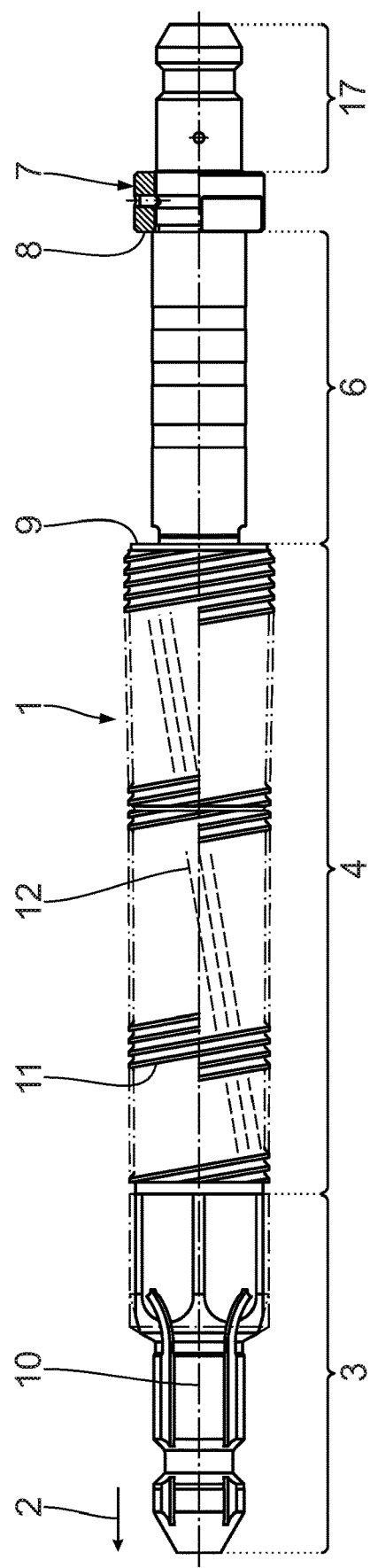
FIG. 4 shows the tool according to FIG. 1 with the precise sizing bush omitted.
Figure 5:
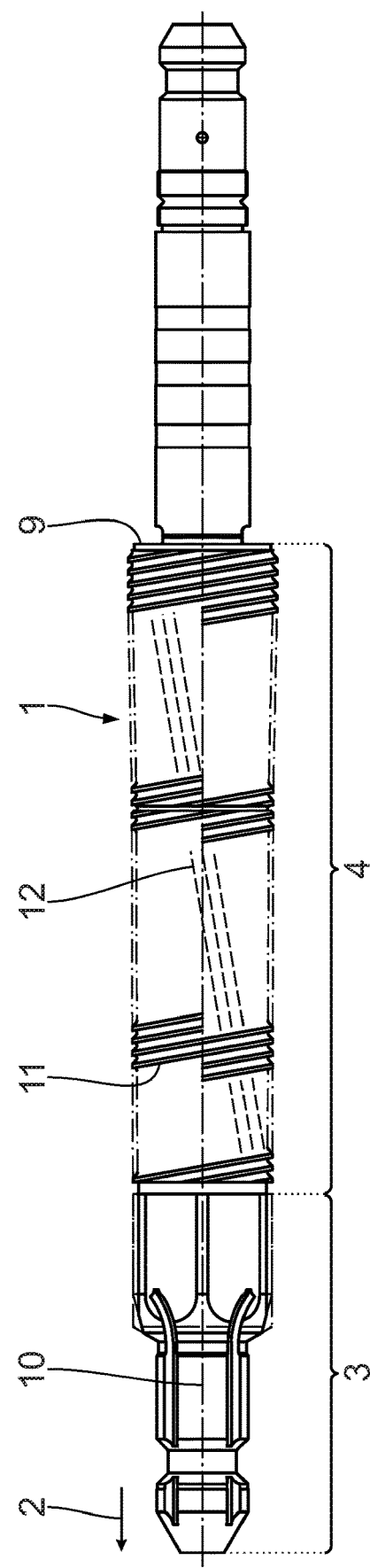
FIG. 5 shows the tool according to FIG. 4 with additionally omitted fastening nut or omitted clamping ring.

FIG. 3 shows in detail two broaching teeth 13 arranged one behind the other along a broaching path 12. These broaching teeth 13 of the precise sizing bush 5 have a positive rake angle γ. A chip-removing tooth edge 15 of these broaching teeth 13 with a positive rake angle γ, seen along a radial direction, thus protrudes freely beyond a hollow cylindrical base body 16 of the precise sizing bush 5.

At the free end opposite the tool head portion 3, the tool 1 has a tool terminal portion 17 which is configured for the connection to a bearing body of a broaching drive.

The precise sizing tool portion 5 of the tool 1 is manufactured of a hard metal whose density is greater than 10 g/cm$^3$.

The hard metal may be a tungsten carbide-cobalt hard metal. The hard metal may have small amounts of other carbides, e.g. vanadium carbide, chromium carbide or tantalum-niobium carbide. These proportions of other carbides may be smaller than 2 wt %, may be smaller than 1.5 wt %, may be smaller than 1.0 wt %, may be smaller than 0.75 wt %, and may be smaller than 0.5 wt %. Tungsten carbide grain sizes of the hard metal may be in the range between 0.1 μm to 25 μm and may, for example, be in the range around an average value of 3 μm, of 5 μm, of 8 μm, of 10 μm or of 15 μm. A cobalt content of the hard metal may be in the range of from 1% to 40% and may be in particular in the range of from 2% to 25%.

A tantalum niobium carbide can also be greater than 5%, can be greater than 10% and can be greater than 20%.

The hard metal may contain proportions of other carbides or mixed carbides, e.g. titanium carbide or zirconium carbide.

The proportions of these mixed carbides can be in the range between 0.5% and 25%, can be in the range between 1% and 20%, can be in the range between 5% and 15% and can also be in the range around 10%. A mixed carbide proportion may be smaller than 8% in total. Alternatively, a mixed carbide proportion may also be greater than 12%.

A cermet can also be used as the hard metal. The hard metal may contain titanium carbide or titanium nitride. A binding matrix of such a hard metal may have nickel, cobalt and/or molybdenum.

As an alternative or in addition to the hard material tungsten carbide, titanium carbide, titanium nitride, niobium carbide, tantalum carbide or vanadium carbide can also be used as the hard material of the hard metal. Besides cobalt, nickel or a cobalt-nickel mixture can also be used as a binding matrix for the hard metal.

A tungsten carbide proportion of the hard metal may be in the range between 65% and 99% and may be in particular in the range between 75% and 95%, for example at 85%. A cobalt proportion of the hard metal can be in the range between 1% and 35% and in particular in the range between 5% and 25%, for example in the range of 15%. Nickel can also be used alternatively or additionally as a binding matrix. An iron-containing mixture, for example an iron/nickel/cobalt mixture, can also be used as a binding matrix.

The precise sizing bush 5 can be configured in such a way that all broaching teeth 13 have a positive rake angle. Alternatively, the precise sizing bush 5 can also have at least some broaching teeth with a negative rake angle and/or with a rake angle of 0°. A proportion of broaching teeth 13 with a positive rake angle in the number of all broaching teeth can be in the range between 5% and 100% and can be, for example, 10%, 20%, 30%, 40%, 50%, 60%, 70%, 80%, 90%, 100%.

When machining the workpiece, the precise sizing tool portion 5 removes small amounts of material for fine or ultra-fine machining, i.e. smoothing the workpiece. To this end, a cutting speed can be in the range between 1 m/min to 12 m/min.

The invention claimed is:

1. An internal helical broaching tool (1) for broaching internal round profiles of gears with helical toothing, comprising:
    a pre-broaching tool portion (4) extending in a broaching direction (2), and
    a precise sizing tool portion (5),
    wherein broaching teeth of the pre-broaching tool portion (4) are arranged one behind the other in the broaching direction (2) such that the broaching teeth are arranged obliquely one behind the other along helical broaching paths (12),
    wherein broaching teeth (13) of the precise sizing tool portion (5) are arranged one behind the other,
    wherein the precise sizing tool portion (5) consists of a hard metal having density that is greater than 10 g/cm$^3$, and
    wherein the broaching teeth of the pre-broaching tool portion (4) and the broaching teeth (13) of the precise sizing tool portion (5) are circumferentially spaced apart,
    wherein the pre-broaching tool portion (4) is made of high-speed steel,
    wherein the internal helical broaching tool is designed so that a torsional load occurs during helical broaching, and
    wherein an oblique course of the helical broaching paths corresponds to an oblique course of the helical toothing.

2. The tool according to claim 1, wherein at least one of the broaching teeth (13) of the pre-broaching tool portion (4) and broaching teeth (13) of the precise sizing tool portion (5) have a positive rake angle (Y).

3. The tool according to claim 1, wherein the precise sizing tool portion (5) comprises a precise sizing bush which is slid onto a tool carrier portion (6).

4. The tool according to claim 3, further comprising a fastening nut (7) which fixes the precise sizing bush (5) to the tool carrier portion (6).

5. The tool according to claim 4, wherein the fastening nut (7) clamps the precise sizing bush (5) between an abutment wall (8) of the fastening nut 7 and a counter-abutment shoulder (9) of a basic body of the tool (1).

6. The tool according to claim 1, wherein the tool is configured to withstand torsional load.

7. The tool according to claim 1, wherein the pre-broaching tool portion (4) and the precise sizing tool portion (5) have helical toothing with a plurality of threads.

8. The tool according to claim 7, wherein a gear distance is smaller for the pre-broaching tool portion (4) than for the precise sizing tool portion (5).

9. The tool according to claim 1,
    wherein the precise sizing tool portion (5) comprises a precise sizing bush which is slid onto a carrier portion (6) of a base body, and
    wherein the base body and the precise sizing bush (5) are coated with different coatings.

10. The tool according to claim 1, wherein the broaching teeth (13) of the precise sizing tool portion (5) are arranged obliquely one behind the other along the helical broaching paths (12).

* * * * *